United States Patent [19]

Hanano

[11] Patent Number: 5,385,196
[45] Date of Patent: Jan. 31, 1995

[54] SPRAY METHOD OF PERMANENT MOLD CASTING POWDERY MOLD COATING AGENT

[75] Inventor: Takashi Hanano, Kobe, Japan

[73] Assignee: Hanano Corporation, Hyogo, Japan

[21] Appl. No.: 132,914

[22] Filed: Oct. 7, 1993

[30] Foreign Application Priority Data

Nov. 27, 1992 [JP] Japan .................. 4-318635

[51] Int. Cl.6 .................................. B05D 1/06
[52] U.S. Cl. .......................... 164/72; 164/267
[58] Field of Search .................... 164/72, 267

[56] References Cited

FOREIGN PATENT DOCUMENTS 63-137539 6/1988 Japan ........................ 164/72
4-138861 5/1992 Japan ........................ 164/72

Primary Examiner—Kuang Y. Lin
Attorney, Agent, or Firm—Foley & Lardner

[57] ABSTRACT

In a spray method for spraying and applying a powdery mold coating agent onto both inside surfaces of a movable metal mold and a stationary metal mold for a permanent mold casting device, a spray method of permanent mold casting powdery mold coating agent in which a spray head provided with an electrostatic spray gun is fit to a feeding port so as to shut it tightly and a suction head connected to a suction pump is fit to a riser port so as to shut it tightly under a state where the movable metal mold and the stationary metal mold are closed. An inside of cavity is sucked by the suction pump through the riser port so as to produce a pressure difference between inside and outside of the cavity, and a powdery mold coating agent supplied from a powdery mold coating agent feeding device to the electrostatic spray gun is discharged from the electrostatic spray gun by means of the above pressure difference so as to be electrostatically adsorbed onto the inside surfaces of the foregoing both metal molds.

3 Claims, 2 Drawing Sheets

SPRAY METHOD OF PERMANENT MOLD CASTING POWDERY MOLD COATING AGENT

BACKGROUND OF THE INVENTION

This invention relates to a spray method for spraying and applying a powdery mold coating agent onto both inside surfaces of a movable metal mold and a stationary metal mold for a permanent mold casting device.

Application of the mold coating agent onto both inside surfaces of a movable metal mold and a stationary metal mold for a permanent mold casting device has previously been carried out as follows. The metal molds have been removed from the device before commencing casting work, and then the mold coating agent has been applied onto both inside surfaces of the metal molds by hand spraying. In the event the mold coating agent has dropped away from the inside surfaces of the metal molds or has been exhausted in the middle of casting work, the mold coating agent has been applied onto this portion by means of hand spray.

In the foregoing application method, however, there have been the following problems. The application work has been done on the basis of experiences and perceptions of workers, so that there have been variations in the amounts of coating applied by the respective workers. Therefore, respective qualities of castings have also been varied. Further, since there have been variations in the thicknesses of the applied and formed mold coating agent films or the service lives of the films, the production has been carried on in a state of "How many times does the mold coating agent film withstand the casting work?" i.e., the service life of the mold coating agent film has not been known exactly, so that there has been a possibility of producing a large number of defective pieces. Moreover, it has been necessary to check the mold coating agent film without interruption during the work, so that its workability has been bad. Furthermore, it has been required for the worker to become skilled to a high degree, however, lack of manpower has become serious problem with the advancing age of workers. In addition, the work environment has become worse due to the mold coating agent being dispersed around the work area.

This invention is made in order to solve the above problems, and an object of this invention is to provide a spray method of permanent mold casting powdery mold coating agent which can improve the workability of application of the mold coating agent, enables the casting work to be automated, and can produce uniform and high quality castings

SUMMARY OF THE INVENTION

This invention provides a method for spraying and applying a powdery mold coating agent onto both inside surfaces of a movable metal mold and a stationary metal mold for a permanent mold casting device, in which a spray head provided with an electrostatic spray gun is fit to a feeding port of the mold so as to shut it tightly and a suction head connected to a suction pump is fit to a riser port of the mold so as to shut it tightly when the movable metal mold and the stationary metal mold are closed. The inside of the mold cavity is evacuated by the suction pump through the riser port so as to produce a pressure difference between inside and outside of the cavity, and a powdery mold coating agent supplied from a powdery mold coating agent feeding device to the electrostatic spray gun is discharged from the electrostatic spray gun by means of the above pressure difference so as to be electrostatically adsorbed onto the inside surfaces of the metal molds.

In this invention, the work of fitting the spray head and the suction head, the work by the suction pump and the supplying of the powdery mold coating agent to the electrostatic spray gun are repetitive operations, so that it is possible to automate these steps. Further, it is possible to control the amount of coating so that a mold coating agent film can be obtained with a good reproducibility, and uniformity of and improvement in quality of castings can be accomplished.

Further, since the movable metal mold and the stationary metal mold are subjected to the coating application work while still mounted on the molding device, steps such as dismounting and remounting of metal molds become unnecessary. Moreover, the thickness of the applied and formed mold coating agent film or its service life can be known because the feed amount of the mold coating agent can be controlled precisely, so that it is not necessary to check the mold coating agent film in the middle of the casting work. Accordingly, efficiency can be improved by a large margin.

In addition, the movable metal mold and the stationary metal mold are in the closed state so that the mold coating agent does not scatter. Consequently, the deterioration of the surrounding environment can be prevented.

DETAILED DESCRIPTION OF THE INVENTION

An embodiment of this invention will be described hereunder with reference to the drawings.

Figure 1:
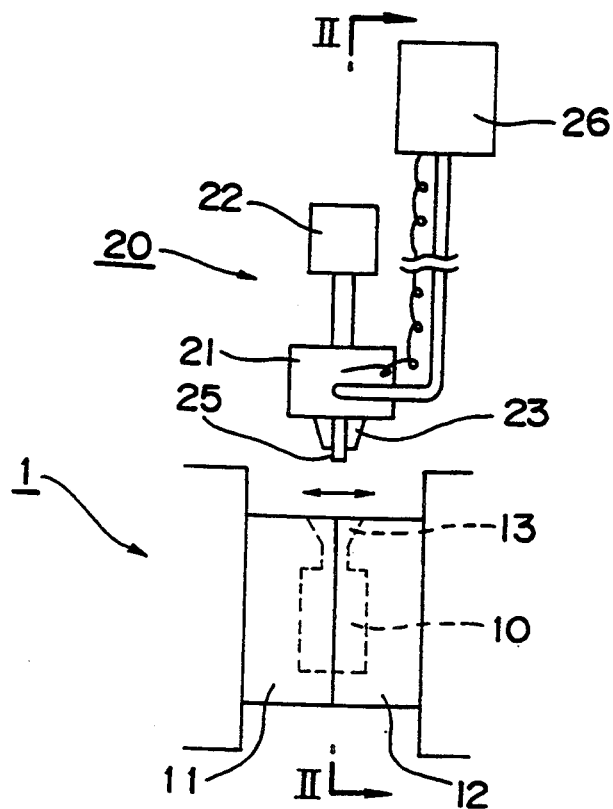
FIG. 1 is a front view showing a spray device for carrying out a spray method of this invention.
Figure 2:
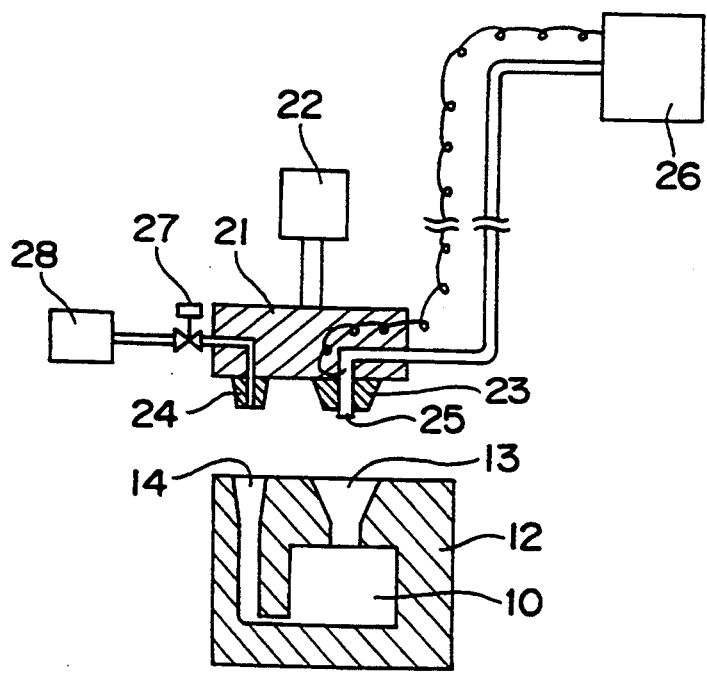
FIG. 2 is a sectional view taken on a line II—II of FIG. 1.

FIG. 1 is the front view showing the spray device for carrying out the spray method of this invention. FIG. 2 is the sectional view taken on the line II—II of FIG. 1. In these figures, 1 denotes a permanent mold casting device equipped with a movable metal mold 11 and a stationary metal mold 12 which can be opened and closed in the direction of the arrow.

20 denotes a spray device. In the spray device 20, a body 21 is supported by a cylinder mechanism 22 so as to be movable in a vertical direction. 23 denotes a spray head having a size and shape to fit to a feeding port 13 so as to shut it tightly when metal molds 11 and 12 are closed. 24 denotes a suction head having a size and shape to fit to a riser port 14 so as to shut it tightly, when metal molds 11 and 12 are closed.

Figure 3:
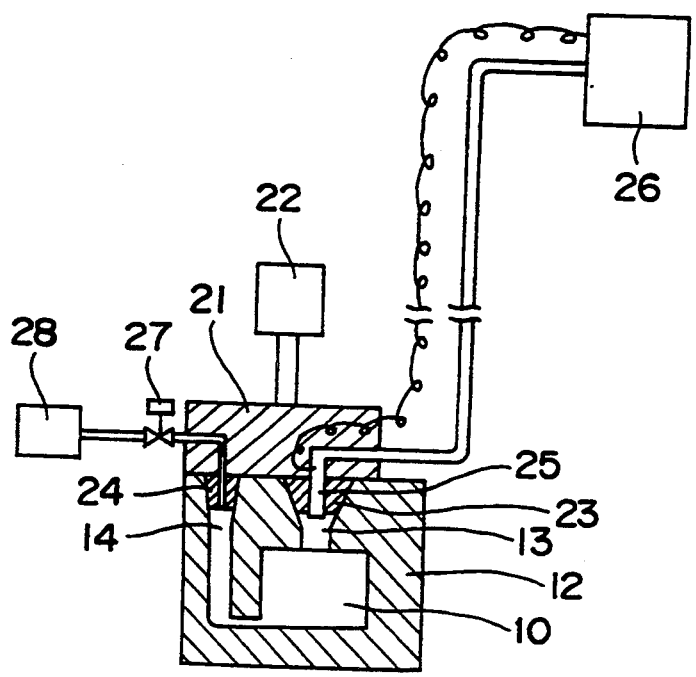
FIG. 3 is a sectional view showing a working state of the spray device.

The spray head 23 and the suction head 24 are installed on a bottom face of the body 21 as shown in FIG. 3, so that they fit to the feeding port 13 and the riser port 14 simultaneously when the body 21 goes down. The spray head 23 is to be provided with an electrostatic spray gun 25 in such a way as freely detachable. A delivery port of the electrostatic spray gun 25 is located at a position lower than the bottom end of the spray head 23. 26 is a device for supplying the powdery mold coating agent and also for generating static electricity, and the device 26 is connected to the electrostatic spray gun 25. The suction head 24 is connected to a vacuum pump 28 through a shut-off valve 27.

The spray method of this invention using the spray device having the foregoing construction will be described hereunder.

In the first place, the movable metal mold 11 and the stationary metal mold 12 are brought to the closed state, and the body 21 is located at upper parts of the both metal molds 11 and 12. In the second place, the body 21 is moved downward by the cylinder mechanism 22, and then the spray head 23 and the suction head 24 are simultaneously made to fit to the feeding port 13 and the riser port 14 respectively so as to close the cavity 10 tightly, as shown by FIG. 3. In the third place, the vacuum pump 28 is operated and the shut-off valve 27 is opened so that air in the cavity 10 is evacuated to produce a pressure difference between the inside and outside of the cavity 10. The device 26 is operated under this state, and a required amount of powdery mold coating agent is supplied to the electrostatic spray gun 25, and static electricity is generated in the electrostatic spray gun 25. The powdery mold coating agent electrified with static electricity is thereby discharged from the electrostatic spray gun 25. In other words, the powdery mold coating agent is sprayed onto the inside surfaces of the metal molds 11 and 12. The sprayed powdery mold coating agent is electrostatically adsorbed onto the inside surfaces of the both metal molds 11 and 12 to form a mold coating agent film.

Figure 4:
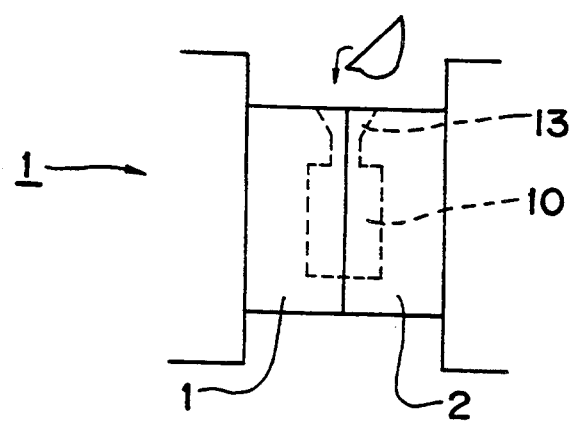
FIG. 4 is a front view showing an ordinary molten metal feeding operation.

After completion of the spraying, the shut-off valve 27 is closed and the body 21 is moved upward so as to permit the ordinary molten metal feeding operation. Namely, as shown by FIG. 4, an aluminum alloy for example is filled from the feeding port 13 into the cavity 10, the metal molds 11 and 12 are opened after the aluminum alloy has solidified, and an aluminum alloy cast product is taken out.

In the above movements, the vertical movement of the body 21, the opening and closing of the shut-off valve 27, the operation of the vacuum pump 28 and the operation of the device 26 are carried out by automatic control.

The spraying operation may be carried out several times as occasion demands. Several discharges may be carried out on a portion developing a high inside surface temperature or a portion including a complex shape of the metal molds 11 and 12, for instance, so that an uniform mold coating agent film can be formed. Or, the electrostatic spray gun may be replaced with one having many discharge ports and the spraying may be carried out on the portions as described above. The same effect can also be obtained in this case.

Since the above-mentioned spray method is carried out automatically by using the spray device 20, it becomes possible to control the amount of coating. For this reason, the mold coating agent film can be obtained with a good reproducibility and the uniformality and improvement in quality of the castings can be accomplished.

The metal molds 11 and 12 are subjected to the spraying while mounted on the device 1, so that dismounting and remounting steps are not necessary. Further, since the fed amount of mold coating agent is controlled accurately by the device 26, the thickness of the applied and formed mold coating agent film or its service life can be known with precision, so that it is not necessary to check the mold coating agent film in the middle of casting work. Accordingly, the efficiency can be improved by a large margin.

Since the metal molds 11 and 12 are in the closed state, dispersing of the mold coating agent does not occur. Therefore, the deterioration of surrounding the environment can be prevented.

According to the present invention as described above, when the both metal molds 11 and 12 are closed, the spray head 23 provided with the electrostatic spray gun 25 is fit to the feeding port 13 so as to shut it tightly and the suction head 24 connected to the suction pump 28 is fit to the riser port 14 so as to shut it tightly. The inside of the cavity 10 is evacuated by the suction pump 28 through the riser port 14 so as to produce a pressure difference between the inside and outside of the cavity 10, and the powdery mold coating agent supplied from the device 26 to the electrostatic spray gun 25 is discharged from the electrostatic spray gun 25 by means of the above pressure difference so as to be electrostatically adsorbed onto the inside surfaces of the metal molds 11 and 12. Therefore, the following effects can be obtained.

(1) Since the spray work can be done automatically using the spray device 20, the amount of coating can be controlled. Consequently, the mold coating agent film can be obtained with a good reproducibility, and the uniformity and improvement in quality of castings can be accomplished.

(2) The metal molds 11 and 12 are subjected to the spray treatment while still mounted on the device 1, so that dismounting and remounting steps can be made unnecessary. Further, since the fed amount of mold coating agent is controlled accurately by the device 26, the thickness of the applied and formed mold coating agent film or its service life can be known with precision, so that it can be made unnecessary to check the mold coating agent film in the middle of casting work. Accordingly, the efficiency can be improved by a large margin.

(3) Since the metal molds 11 and 12 are in the closed state, dispersing of the mold coating agent can be prevented. Therefore, the deteriorating of surrounding environment can be prevented.

When several times of discharges are carried out on a portion developing a high inside surface temperature or a portion including complex shape of the both metal molds 11 and 12, an uniform mold coating agent film can be formed. Incidentally, the electrostatic spray gun may be replaced with one having many discharge ports and the spraying may be carried out on the portions as described above. The same effect can also be obtained in this case.

What is claimed is;

1. A method for spraying a powdery mold coating agent onto inside surfaces of a movable metal mold member and a stationary metal mold member of a permanent mold casting device, the movable mold member and the stationary mold member having inside surfaces defining a mold cavity, a feeding port in fluid communication with the cavity and a riser port in fluid communication with the cavity, the coating agent being supplied from an apparatus which comprises a spray head provided with an electrostatic spray gun to which the powdery mold coating agent is supplied by a feeding device and a suction head connected to a suction pump, the method comprising:

fitting the spray head to the feeding port so as to close the feeding port tightly;

fitting the suction head to the riser port so as to close the riser port tightly;

evacuating the mold cavity with the suction pump so as to produce a pressure differential between the inside and outside of the cavity; and supplying powdery mold coating agent to the electrostatic spray gun and discharging the coating agent from the spray gun so as to be electrostatically adsorbed onto the inside surfaces of the movable mold member and the stationary mold member.

2. The method of claim 1, wherein at least a portion of the inside surfaces of the stationary mold member and the movable mold member develops a high temperature during molding or has a complex shape, the method further comprising subjecting said portion of the inside surfaces to a plurality of discharges of the powdery mold casting agent.

3. The method of claim 1, wherein at least a portion of the inside surfaces of the stationary mold member and the movable mold member develops a high temperature during molding or has a complex shape, the method further comprising discharging the powdery mold coating agent from a spray gun which is provided with a plurality of discharge ports.

* * * * *